Patented Mar. 10, 1931

1,796,115

UNITED STATES PATENT OFFICE

ARTHUR R. MURPHY, OF MILWAUKEE, AND JOSEPH B. OESCH, OF SOUTH MILWAUKEE, WISCONSIN, ASSIGNORS, BY MESNE ASSIGNMENTS, TO NEWPORT CHEMICAL CORPORATION, A CORPORATION OF DELAWARE

METHOD FOR IMPROVING THE SOLUBILITY OF DYESTUFFS

No Drawing.    Application filed February 6, 1928. Serial No. 252,424.

This invention relates to a method for improving the solubility of certain dyestuffs in the dyebath, with particular reference to those dyestuffs which tend to form insoluble lakes with impurities normally present in technical dyestuffs or present in the water of the dyebath.

It is an object of this invention to provide a method for the ready solution in the dye bath of colors which have a tendency to form insoluble precipitates when diluted with water and more especially when diluted with water having an appreciable hardness.

It is known that certain dyestuffs, even though of high purity, have the property of forming precipitates or lakes with the impurities normally present in ordinary water, thereby lowering the efficiency of the dyeing operation and producing spotted, streaky and uneven dyeings. This is a particularly troublesome point, since it is usually impossible to predict the quality of water used in the dyeing process, due to variations in various geographical localities in the hardness of the water.

It is therefore a further object to provide a method of obtaining satisfactory solution of the dyestuff in water from whatever source, and to offset to a large degree the variations in dyeing caused by waters of different hardness, so that similar dyeing shades and efficiency may be expected regardless of the type of water used in the dyebath.

It is still a further object of this invention to provide a method of making up a stock solution of a dyestuff in ordinary water so that the concentration of the dyestuff in the stock solution will remain substantially homogeneous.

Other and further objects will become apparent from disclosures in the specification and appended claims.

Heretofore known methods of avoiding the difficulties outlined above have employed the following aids to solution of the dyestuff. Certain salts, as for example Glauber's salt, sodium carbonate, disodium phosphate and the like have been either mixed with the dyestuff before dissolving in the dyebath or added to the dyebath itself previous to the dissolving of the dyestuff. The added salts tend to remove the hardness properties of the water, precipitating out the dissolved calcium in the form of calcium carbonate, calcium sulphate, calcium phosphate, or other insoluble calcium salt. In certain other cases, soaps have been employed for removing the hardness. By the use of the above methods, advantages are gained whereby many dyestuffs may be dissolved in an efficient manner. However, in certain other cases, the above methods of treatment are entirely inadequate to perform the function.

We have discovered that the soluble pyrophosphate salts, particularly sodium pyrophosphate, when mixed with these dyestuffs or added to the dyebath previous to the addition of the dyestuff, react in a most unusual manner to effect clear solution of the dyestuff in water. By using a pyrophosphate in this way, certain dyestuffs which could not be adequately dissolved in the dyebath by employing previously known methods, dissolve to clear solutions and produce level dyeings.

The nature of the specific reaction involved is unknown to us. It may be that the reaction is due to the removal of the hardness of the water in the form of insoluble salts, such as calcium pyrophosphate. However, when the results obtained by the use of sodium sulfate, sodium carbonate, disodium phosphate, soap and the like, which, as is known, form practically insoluble calcium salts, are compared, our theory does not seem to account for the remarkable differences. It may be that the metals capable of forming lakes with the dye-stuffs enter into a complex combination with the pyrophosphate and in the combination are incapable of forming lakes with the respective dyestuffs. A further explanation of the phenomena occurring in the dyebath in conjunction with the use of pyrophosphate salts is that the lake of the dyestuff may actually be precipitated in a colloidal form, thereby escaping detection to the eye and for all practical purposes reacting as a true solution.

Notwithstanding the hypothetical nature of such theories, the fact remains that pyrophosphate salts, when employed in the dissolving of dyestuffs, possess the remarkable property in a high degree of easily effecting clear solutions of the dyestuffs even in hard waters.

The following tabulated data and the examples will serve to illustrate further the invention. At the head of the columns are certain dyestuffs which tend to form insoluble lakes with the impurities normally present in water, followed by the usual concentration of the dyestuff employed, to illustrate the use of pyrophosphate salts in effecting good solubility in water. The lake water referred to in the various experiments has a hardness corresponding to 125 parts per million. A water of this degree of hardness is considered a relatively hard water for use in making up a dyebath. The amounts of salts used, as for example, sodium pyrophosphate, disodium phosphate, sodium carbonate and the like, correspond to three times the amount necessary to combine with the salts producing the hardness in the water. In all these cases, the sodium pyrophosphate gave very satisfactory results, whereas the disodium phosphate and sodium carbonate gave results which show that they are totally unsuited for performing the function.

| Color | Congo Corinth, color index #375 Schultz #312 | Direct fast yellow 5G, color index #346 Schultz #296 | Benzo Purpurin 4B, color index #448 Schultz #363 |
|---|---|---|---|
| Concentration | 1 gr./200 cc. $H_2O$ | 0.2gr./200 cc. $H_2O$ | 1gr./1000 cc. $H_2O$ |
| Solubility Distilled water. | Very slight precipitate. | Clear. | Clear solution. |
| Lake water | Heavy precipitate. | Heavy precipitate. | Slight precipitate. |
| Lake water with sodium pyrophosphate. | Practically clear. | Very slight precipitate cold, completely soluble hot. | Clear solution. |
| Lake water with disodium phosphate. | Heavy precipitate. | Heavy precipitate hot or cold. | Slight precipitate. |
| Lake water with sodium carbonate. | Heavy precipitate. | Heavy precipitate hot or cold. | Slight precipitate. |

Other dyestuffs, which normally react with the salts present in water and responsible for its hardness to form insoluble lakes, give improved results similar to the above when sodium pyrophosphate is employed.

In the following examples are illustrated the actual use of the pyrophosphate salts both by grinding with the dyestuff and by previously adding to the water of the dyebath before adding the dyestuffs. In all examples the lake water employed had a hardness corresponding to 125 parts per million.

Example I 0.2 parts of direct fast yellow 5G (concentrated) are milled with 0.098 parts of anhydrous sodium pyrophosphate. 200 parts of lake water are added and the whole is brought to the boiling temperature. The dyestuff is practically completely in solution at boiling temperature. After cooling and standing overnight, some of the dyestuff precipitates out in the form of a gel with no evidence of the formation of a lake. Cotton may be dyed yellow from the above bath in clear clean shades.

Example II

To 200 parts of lake water are added 0.098 parts of anhydrous sodium pyrophosphate. The solution is heated to the boiling point and there are then added 0.2 parts of direct fast yellow 5G (concentrated). The results obtained are the same as in Example No. I.

Other dyestuffs showing the properties of forming lakes with the impurities normally present in hard water may be treated similarly and show equally good solubility and dyeing property.

It is understood that similar results may be obtained by employing other salts of pyrophosphoric acid, as for instance potassium pyrophosphate, or, in general, any pyrophosphate compound which when dissolved in water reacts to give pyrophosphate ions. It is further known that the concentration of pyrophosphate used may be varied and that in general the higher the degree of hardness present in the water, the greater will be the amount of pyrophosphate salt necessary to give good results.

We are aware of the fact that the pyrophosphate salt may be mixed with the dyestuff in any convenient step in the preparation of the dyestuff itself, as for example, previous to the drying and milling. It is also known to us that the pyrophosphate salts may likewise be used to advantage for the purposes set forth, in combination with other salts as for example disodium phosphate, sodium carbonate, sodium sulphate and the like. We therefore do not purpose limiting the patent granted hereon other than as necessitated by the prior art.

We claim as our invention:

1. The process of improving the solubility of water soluble dyestuffs in water, which comprises dissolving the dyestuff in water in the presence of a soluble pyrophosphate salt.

2. The process of improving the solubility of water soluble dyestuffs in water, which comprises dissolving the dyestuff in water in the presence of sodium pyrophosphate.

3. The process of rendering water soluble dyestuffs more completely soluble in hard waters, which comprises adding to the hard waters a soluble pyrophosphate salt and a dyestuff.

4. The process of rendering water soluble dyestuffs more completely soluble in hard waters, which comprises adding to the hard waters sodium pyrophosphate and a dyestuff.

5. As a new article of manufacture, water soluble dyestuff material containing a soluble pyrophosphate.

6. As a new article of manufacture, water soluble dyestuff material containing sodium pyrophosphate.

7. Solutions containing a water soluble dyestuff and a soluble pyrophosphate salt.

8. Solutions containing a water soluble dyestuff and sodium pyrophosphate.

In testimony whereof we have hereunto subscribed our names at Carrollville, Wis., February 3, 1928.

ARTHUR R. MURPHY.
JOSEPH B. OESCH.